United States Patent [19]
Hiroya et al.

[11] Patent Number: 5,276,617
[45] Date of Patent: Jan. 4, 1994

[54] TRANSACTION PROCESSING SYSTEM AND METHOD

[75] Inventors: Masaaki Hiroya; Keiichi Yamada, both of Kawasaki; Khotaro Yamashita, Machida, all of Japan

[73] Assignee: Hitachi, Ltd., Tokyo, Japan

[21] Appl. No.: 534,463

[22] Filed: Jun. 7, 1990

[30] Foreign Application Priority Data

Jun. 16, 1989 [JP] Japan ................ 01-152340

[51] Int. Cl.⁵ .................................. G06F 15/30
[52] U.S. Cl. ...................... 364/424.02; 235/379; 364/401
[58] Field of Search ............... 364/424.02, 400, 401, 364/424.01, 407; 180/167-170; 235/379, 381

[56] References Cited
U.S. PATENT DOCUMENTS 4,959,798  9/1990  Gordon et al. ............... 364/424.02

FOREIGN PATENT DOCUMENTS 55-88105  7/1980  Japan .
59-11412  1/1984  Japan .
60-11988  1/1985  Japan .
60-17584  1/1985  Japan .

Primary Examiner—Thomas G. Black
Attorney, Agent, or Firm—Fay, Sharpe, Beall, Fagan, Minnich & McKee

[57] ABSTRACT

A processor is provided for determining the layout of a branch of a bank or the like. On the basis of the determined layout, the processor further determines a moving route of a transaction processing apparatus to be moved. The transaction processing apparatus is moved to a predetermined position along the determined moving route. In that case, the transaction processing apparatus recognizes its own position and at the same time controls a driving mechanism so that the transaction processing apparatus is moved along the moving route. The driving mechanism is incorporated in the transaction processing apparatus.

24 Claims, 12 Drawing Sheets

FIG. 4

| ROUTE NAME | ROUTE |
|---|---|
| ROUTE 1 | $(x11, y11)$ $(x12, y12)$ $\cdots$ $(x1n, y1n)$ |
| ROUTE 2 | $(x21, y21)$ $(x22, y22)$ $\cdots$ $(x2n, y2n)$ |
| : | |
| ROUTE m | $(xm1, ym1)$ $(xm2, ym2)$ $\cdots$ $(xmn, ymn)$ |

| ROUTE PATTERN NAME | TRANSACTION PROCESSING APPARATUS IDENTIFYING NAME | ROUTE NAME |
|---|---|---|
| PATTERN 1 | MACHINE 1 | ROUTE i11 |
| | : | : |
| | MACHINE j | ROUTE i1j |
| PATTERN 2 | MACHINE 1 | ROUTE i21 |
| | : | : |
| | MACHINE j | ROUTE i2j |
| : | : | : |
| PATTERN K | MACHINE 1 | ROUTE iK1 |
| | : | : |
| | MACHINE j | ROUTE iKj |

| ESTIMATED NUMBER OF CUSTOMERS | ROUTE PATTERN |
|---|---|
| <200 | PATTERN 1 |
| ≧200 AND <400 | PATTERN 2 |
| ≧400 AND <600 | PATTERN 3 |
| ≧600 AND <800 | PATTERN 4 |
| ≧800 AND <1000 | PATTERN 5 |
| ≧1000 | PATTERN 6 |

| DATE OF DAY | ESTIMATED NUMBER OF CUSTOMERS |
|---|---|
| 4 / 10 | 1100 |
| 4 / 11 | 600 |
| 4 / 12 | 500 |
| 4 / 13 | 500 |
| 4 / 14 | 800 |
| 4 / 15 | 300 |
| 4 / 17 | 700 |
| ⋮ | ⋮ |

| DAY OF WEEK | ESTIMATED NUMBER OF CUSTOMERS |
|---|---|
| MON. | 800 |
| TUE. | 600 |
| WED. | 500 |
| THU. | 600 |
| FRI. | 900 |
| SAT. | 300 |

| DATE OF DAY | ESTIMATED NUMBER OF CUSTOMERS | PRIORITY |
|---|---|---|
| 10 | 1000 | 2 |
| 20 | 1000 | 2 |
| 27 | 1000 | 2 |
| 30 | 1000 | 2 |
| OTHERS | 0 | 4 |

| DAY OF WEEK | ESTIMATED NUMBER OF CUSTOMERS | PRIORITY |
|---|---|---|
| MON. | 1000 | 3 |
| TUE. | 800 | 3 |
| WED. | 700 | 3 |
| THU. | 800 | 3 |
| FRI. | 1000 | 3 |
| SAT. | 300 | 1 |
| SUN. | 0 | 1 |

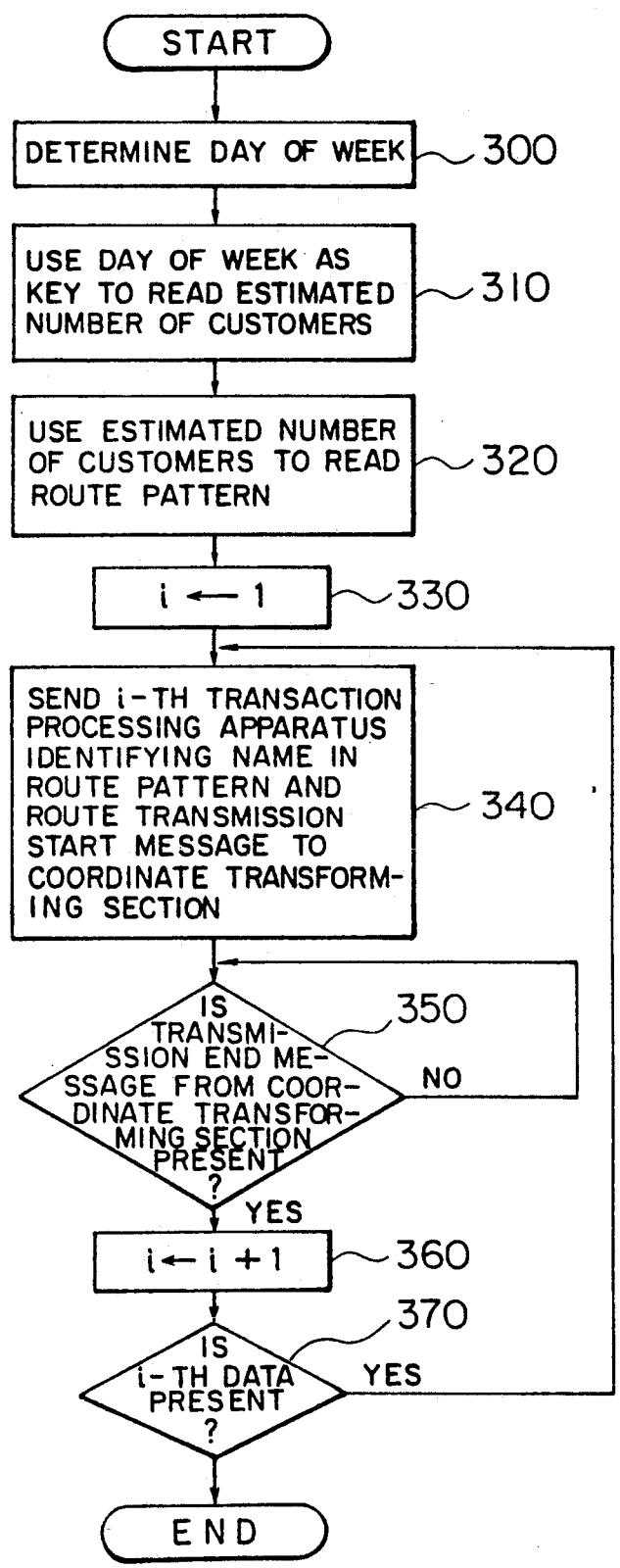

| ESTIMATED NUMBER OF TRANSACTIONS |||||||| ROUTE PATTERN |
|---|---|---|---|---|---|---|---|---|
| DEPOSIT || WITHDRAWAL || SENDING TO ACCOUNT || PAYMENT OF PUBLIC UTILITY CHARGES |||
| ≥ | < | ≥ | < | ≥ | < | ≥ | < | |
| 0 | 20 | 0 | 200 | 0 | 10 | 0 | 10 | PATTERN a1 |
| 20 | 40 | 0 | 200 | 0 | 10 | 0 | 10 | PATTERN a2 |
| : | : | : | : | : | : | : | : | : |
| 0 | 20 | 200 | 300 | 0 | 10 | 0 | 10 | PATTERN b1 |
| : | : | : | : | : | : | : | : | : |
| 0 | 20 | 0 | 200 | 10 | | | | PATTERN c1 |

| DAY OF WEEK | ESTIMATED NUMBER OF TRANSACTIONS ||||
|---|---|---|---|---|
| | DEPOSIT | WITHDRAWAL | SENDING TO ACCOUNT | PAYMENT OF PUBLIC UTILITY CHARGES |
| MON. | 50 | 510 | 50 | 30 |
| TUE. | 30 | 400 | 40 | 30 |
| WED. | 40 | 350 | 40 | 30 |
| THU. | 30 | 360 | 40 | 30 |
| FRI. | 45 | 600 | 50 | 30 |
| SAT. | 0 | 350 | 0 | 0 |
| SUN. | 0 | 0 | 0 | 0 |

| NUMBER OF TRANSACTIONS ||||
|---|---|---|---|
| DEPOSIT | WITHDRAWAL | SENDING TO ACCOUNT | PAYMENT OF PUBLIC UTILITY CHARGES |
| 45 | 512 | 32 | 14 |

TRANSACTION PROCESSING SYSTEM AND METHOD

BACKGROUND OF THE INVENTION

The present invention relates to a transaction processing system and a transaction processing method which customers utilize for transactions such as the deposit/withdrawal of savings, the sending of money to an account for the payment of public utility charges at a branch of a bank or the like. The present invention further relates to a change of the layout of the branch.

A conventional transaction processor or transaction processing apparatus uses a power supply cable for providing electric power and a communication cable for facilitating communication of transaction data with a central processing unit, however, it is not provided with driving means and drive controlling means necessary for movement of the transaction processing apparatus. Also, there is not known any transaction processing apparatus the place of installation of which can be changed in accordance with the crowdness of customers in a branch of a bank.

An existing self-navigating vehicle is known as a self-navigating unmanned vehicle. A technique of detecting the current position of a moving body represented by the unmanned vehicle is disclosed by, for example, JP-A-55-88105. A technique of calculating the amount of control for drive of the moving body from a deviation of the current position of the moving body from a predetermined route is disclosed by JP-A-59-11412. According to these techniques, if the unmanned vehicle is furnished with a route where the vehicle is to run, the unmanned vehicle can automatically move on that route.

SUMMARY OF THE INVENTION

An object of the present invention is to provide a transaction processing apparatus which can be easily moved, a transaction processing method which allows a transaction processing apparatus to be easily moved, and a transaction processing system which uses such a transaction processing apparatus or method.

Another object of the present invention is to provide a system and a method which are capable of easily designating a moving route of a transaction processing apparatus.

The above objects are established on the basis of the present inventors' recognition of the prior art which will be shown hereinbelow.

Presently, a bank has a demand for an occasional change of the layout of a branch of the bank in order to give a fresh image of the branch to customers. Also, it is experientially known that the kind and/or amount (or number) of transactions may vary depending on a specific date of the month (for example, 10th day, 20th day or 30th day) for transaction or a day of the week. Therefore, the bank has a demand for changing the place of installation, or location, of a transaction processing apparatus(es) in the branch for effective utilization thereof in accordance with, for example, a date of the month or day of the week.

Further, the bank has a demand for changing the layout of the branch for the purpose of replacing an old transaction processing apparatus with a new one for reasons such as the extension of functions of the transaction processing apparatus.

However, the conventional transaction processing apparatus necessitates a power supply cable because of the ensurance of an electric power from a plug socket and further necessitates a communication line cable for communication with a host computer. Therefore, in the case where the place of installation of a conventional transaction processing apparatus is to be changed, those cables must be wired or distributed again. Also, it is difficult to install the conventional transaction processing apparatus at the center of a lobby of the branch since the cables block the passage. Therefore, it is not possible to easily change the place of installation of the conventional transaction processing apparatus.

As apparent from the foregoing, the lack of mobility of the transaction processing apparatus operates as a large obstacle to a change of the layout of the branch.

To attain the above object, in the present invention, a processor for determining the layout of a branch is provided. The processor determines the layout of the branch accompanied with the movement of a transaction processing apparatus in accordance with a day of the week, a date of the day or a feature of the day. The processor further determines a moving route of the transaction processing apparatus to be moved on the basis of the determined layout of the branch and informs the transaction processing apparatus of the determined moving route. The transaction processing apparatus recognizes its own position and is controlled so that it is moved along the determined moving route and is stopped at a predetermined position.

More particularly, the transaction processing apparatus is provided with communication means for communication with another apparatus, for example, radio communication means using electric waves, infrared rays or the like for receiving a moving route sent from a move command transmitting device, a source of power in which a battery or the like can be built, driving means and drive controlling means necessary for movement, means for determining the current position of the transaction processing apparatus itself, means for generating a drive control command on the basis of the moving route and the current position, storage means for storing the moving route, and means for controlling the above-mentioned various means.

To attain the above object the move command transmitting device is provided with display means for displaying the layout of a branch, a pointing device such as a mouse for inputting a moving route on the display means, means for inputting data of the frequency of use, storage means for storing various data including position data and the use frequency data, means for transforming data of a coordinate on the display means into a coordinate in the branch, means for transmitting to the transaction processing apparatus the moving route transformed to the coordinate in the branch, and control means for controlling the above-mentioned various means.

Since the radio communication means is utilized as the communication means for communication of transaction data or the like with another apparatus and the means capable of being built in is utilized as the source of power, cables restricting the movement of the transaction processing apparatus are not required. Accordingly, it becomes possible to easily move the transaction processing apparatus. Also, by providing the transaction processing apparatus with a body of a vehicle, driving means and drive control means, it becomes possible to move the transaction processing apparatus with no human power. Further, a remote control of the transaction processing apparatus becomes possible by providing the transaction processing apparatus with means for receiving the moving route and the move command, means for determining the current position of the transaction processing apparatus and means for determining the direction of movement on the basis of the given moving route and the current position.

Also, there may be provided means for storing an estimated number of customers (who come to the branch) and/or an estimated frequency of use of the transaction processing apparatus for each transaction subject for each day of the week, each date of the day and/or each time of the day and means for storing a moving route of the self-running transaction processing apparatus corresponding to the estimated number of customers or the estimated frequency of use of the transaction processing apparatus for each transaction subject. In such a case, if the estimated number of customers and/or the estimated frequency of use for each transaction subject for each day of the week, each date of the day and/or each time of the day are preliminarily registered, it becomes possible to automatically change the place of installation of the transaction processing apparatus in accordance with the number of customers in the branch and/or the state of use of the transaction processing apparatus on each day of the week, on each date of the day and/or at each time of the day.

Further, a move command inputting device may be provided with means for extracting the frequency of use of the transaction processing apparatus for each transaction subject from transaction data which is sent from the transaction processing apparatus. Thereby, it becomes possible to automatically update data of an estimated frequency of use for each transaction subject in the move command inputting device.

The other objects of the present invention will become apparent from the description of the present specification and the accompanying drawings and will be easily understood by those skilled in the art.

BRIEF DESCRIPTION OF THE DRAWINGS

FIG. 4 shows a moving-route table;

FIG. 5 shows a route pattern table;

FIG. 6 shows a table of a route pattern for each estimated number of customers (who come to a branch);

FIG. 7 shows a table of an estimated number of customers (who come to a branch) for each date of the day;

FIG. 10 shows a table of an estimated number of customers (who come to a branch) for each day of the week;

FIG. 11 is a flow chart representing a procedure for a processing performed by the route selecting section in the case where the table of an estimated number of customers for each day of the week;

FIG. 12 shows a table of an estimated number of customers (who come to a branch) for each date of the day provided with a priority column;

FIG. 13 shows a table of an estimated number of customers (who come to a branch) for each day to the week provided with a priority column;

FIG. 15 shows a table of a route pattern for each estimated frequency of use for each transaction subject;

FIG. 16 shows a table of an estimated frequency of use for each transaction subject for each day of the week;

FIG. 18 shows a table of a cumulative number of transactions for each transaction subject.

DESCRIPTION OF THE PREFERRED EMBODIMENTS

Embodiments of the present invention will now be explained by use of the accompanying drawings.

Figure 1:
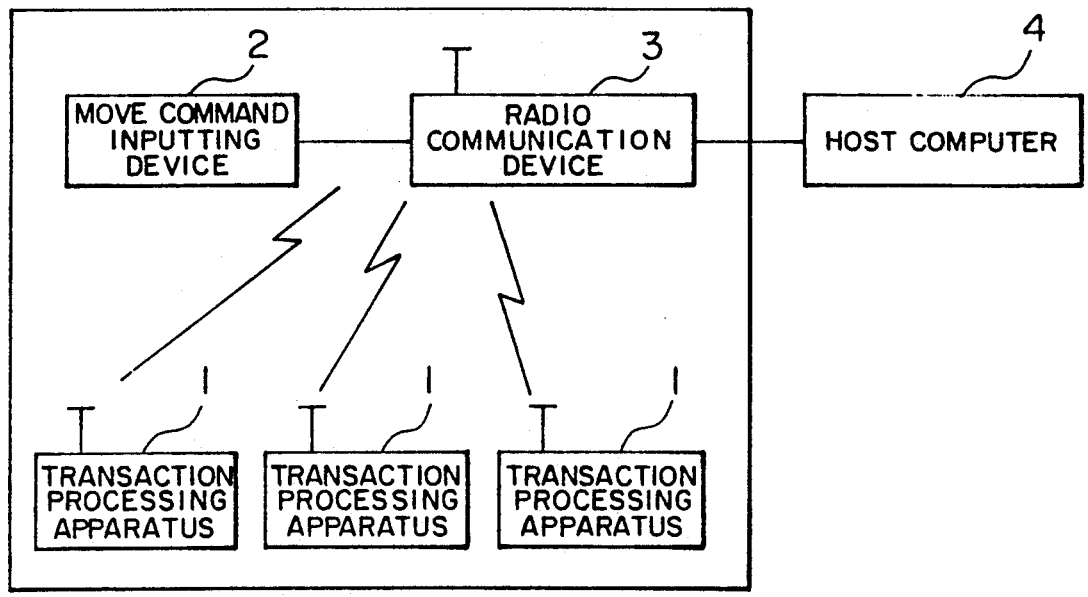
FIG. 1 is a schematic view showing the systematic construction of the present invention.

FIG. 1 is a schematic view showing the systematic construction of the present invention. Reference numeral 1 designates a transaction processing apparatus, numeral 2 a move command inputting device, numeral 3 a radio communication device, and numeral 4 a host computer.

Figure 2:
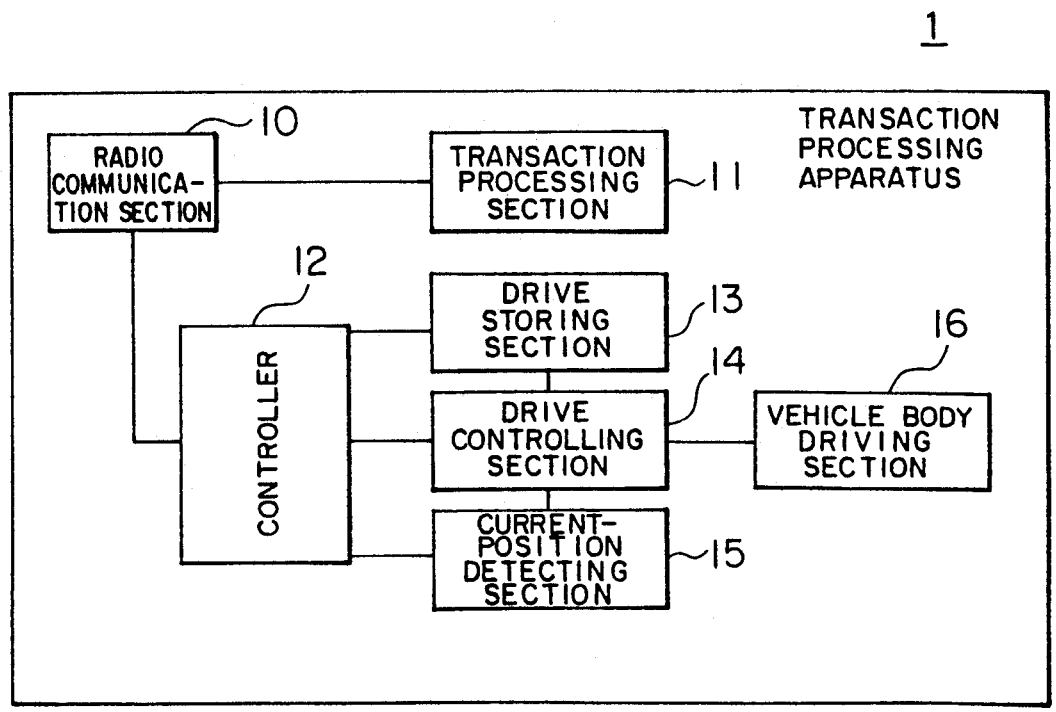
FIG. 2 is a block diagram of a transaction processing apparatus.

FIG. 2 is a block diagram of the transaction processing apparatus 1 according to the present invention. Reference numeral 10 designates a radio communication section for making a communication with the radio communication device 3 in a branch, numeral 11 a transaction processing section for performing transactions such as the deposit/withdrawal of savings and the sending of money to account, numeral 12 a controller for controlling sections related to the movement of the present transaction processing apparatus, numeral 13 a route storing section for storing a moving route, numeral 14 a current-position detecting section for determining the current position of the present transaction processing apparatus, numeral 15 a drive controlling section for determining a deviation of the current position of the present transaction processing apparatus from a moving route designated by the move command inputting device 2 to control a driving device so that the deviation becomes minimum, and numeral 16 a vehicle body driving section.

An existing self-navigating vehicle is known as a self-navigating unmanned vehicle. A technique of detecting the current position of a moving body represented by the unmanned vehicle and a technique of calculating the amount of control for drive of the moving body from a deviation of the current position of the moving body from a predetermined route are known. In that regard, if the unmanned vehicle is furnished with a route where the vehicle is to run, the unmanned vehicle automatically moves on that route. The current-position detecting or determining section 14 and the drive controlling section 15 of the self-running transaction processing apparatus of the present invention can be realized by the above-mentioned known techniques.

Figure 3:
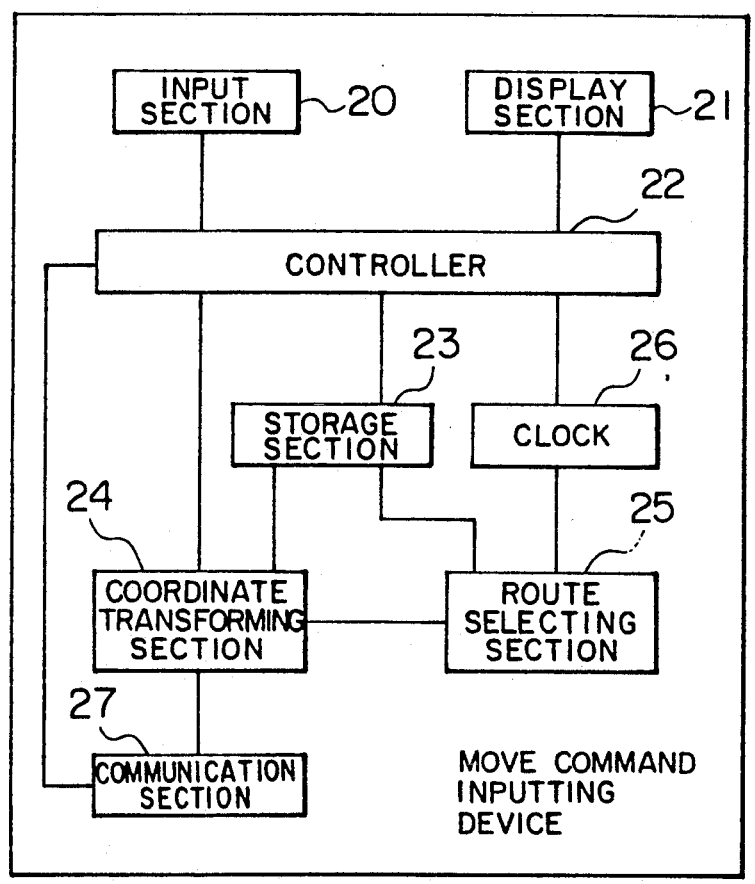
FIG. 3 is a block diagram of a move command inputting device.

FIG. 3 is a block diagram of the move command inputting device 2 according to the present invention. Reference numeral 20 designates an input section including a keyboard and a pointing device, numeral 21 a display section such as a CRT, numeral 22 a controller for controlling various sections of the present move command inputting device, numeral 23 a storage section for storing tables representing various data and relations between data, numeral 24 a coordinate transforming section for transforming a coordinate on a display screen of the display section 21 into a coordinate in a branch, numeral 25 a route selecting section for selecting a moving route of the transaction processing apparatus from a relation between a moving route and an estimated number of customers who come to the branch and a relation between the day of the week, the date of the day and/or the time of the day and an estimated number of customers who come to the branch, which relations are stored in the storage section 23, numeral 26 a clock used for determining the data of the day and/or the time of the day, and numeral 27 a communication section for transmitting a moving route and a move command.

First, the layout of the branch is registered into the move command inputting device 2. If a command for registration of the layout of the branch is inputted from the keyboard of the input section 20, a coordinate axis is displayed on the display section 21. After a magnifying measure (or coefficient of transformation) adapted for the area of dimensions of the branch has been established, the arrangement (or layout) of counters, sofars and so on is written by means of the pointing device of the input section 20. The layout information is stored into the storage section 23 in terms of coordinate values $(x_1, y_1), (x_2, y_2), \ldots, (x_n, y_m)$, in a coordinate system on the CRT display screen. The coefficients of transformation between the coordinate system on the CRT display screen and a coordinate system in the branch are also stored into the storage section 23.

Next, a moving route of the transaction processing apparatus 1 is registered into the move command inputting device 2. The moving route is inputted by means of the pointing device on the display screen on which the previously registered layout of the branch is displayed. After the inputting of the moving route has been completed, the moving route is stored with a name thereof into the storage section 23. FIG. 4 is a moving-route table 40 indicating a correspondence between a moving-route name and a moving route. In the table, the moving route is represented by a train of coordinate values $(x_i, y_i)$ on the display screen.

After the moving-route table 40 has been produced, a route pattern table 41 for storing a relation between a route pattern name, a transaction processing apparatus identifying name and a moving-route name is produced (see FIG. 5). After a command for production of the route pattern table 41 has been inputted, the transaction processing apparatus identifying name and the moving-route name are inputted by means of the keyboard of the input section 20. In the case where the transaction processing apparatus is to be moved, the name of the moving route including the coordinate value representative of the current position of the corresponding transaction processing apparatus 1 is designated. After the pairs of the transaction processing apparatus identifying name and the moving-route name for all the transaction processing apparatus 1 have been inputted, the route pattern name is inputted. The above procedure is repeated by the number of route patterns required. The route pattern table 41 is stored into the storage section 23.

(1) CHANGE OF PLACE OF INSTALLATION OF TRANSACTION PROCESSING APPARATUS IN ACCORDANCE WITH ESTIMATED NUMBER OF CUSTOMERS

The move command inputting device 2 produces a table of a route pattern for each estimated number of customers (who come to the branch) in which the estimated number of customers who come to the branch and the route pattern are paired (see FIG. 6). If the estimated number of customers who come to the branch and the route pattern are inputted in a pair after a command for production of the table 42 of a route pattern and an estimated number of customers who come to the branch has been inputted, the data is stored into the storage section 23. When the inputting of data has been completed, an input completion command is inputted.

(1-a) When Estimated Number of Customers For each Date of Day is Use

The move command inputting device 2 produces a table 43 of an estimated number of customers (who come to the branch) for each data date of the day in which the date of the day and the estimated number of customers who come to the branch are paired (see FIG. 7). If the date of the day and the estimated number of customers who come to the branch are inputted in a pair after a command for production of the table 43 of an estimated number of customers for each date of the day has been inputted, the data is stored into the storage section 23. The estimated number of customers who come to the branch is established by a clerk in change on the basis of data which is experientially obtained. When the inputting of data has been completed, an input completion command is inputted.

Figure 8:
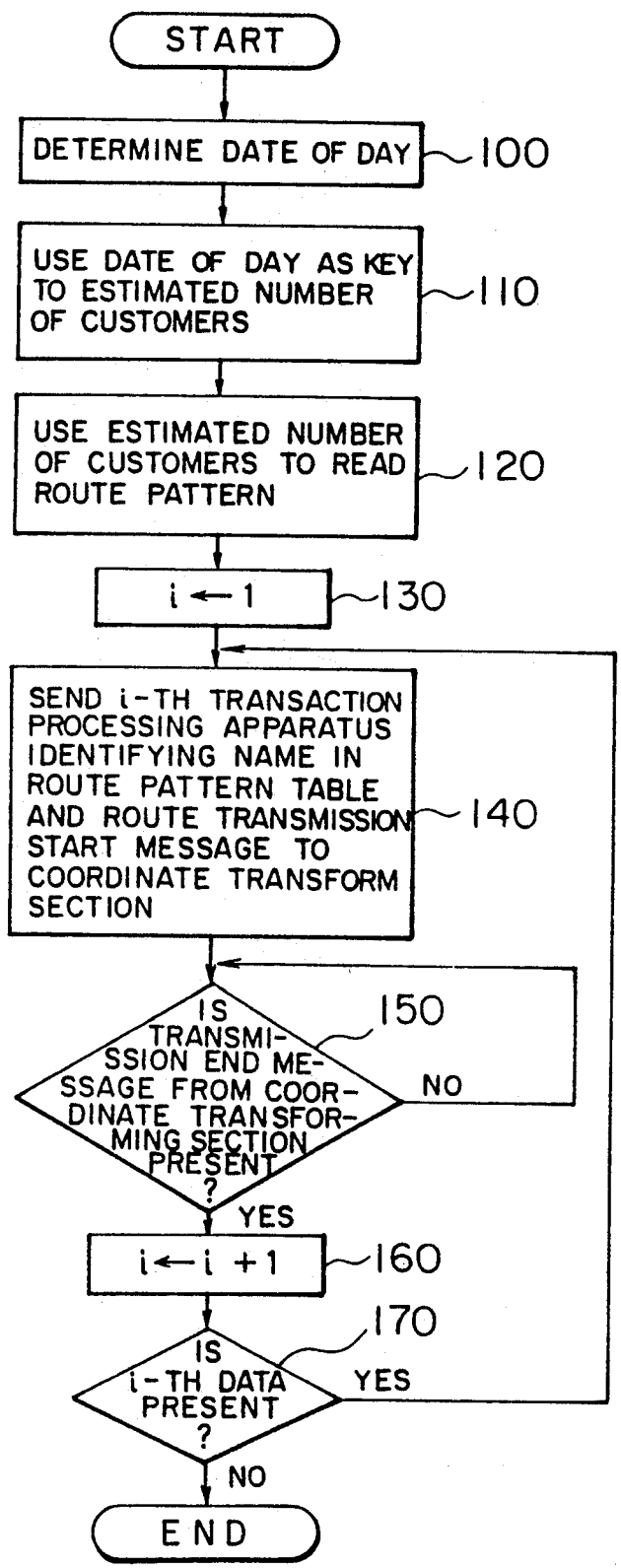
FIG. 8 is a flow chart representing a procedure for a processing performed by a route selecting section in the case where the table of an estimated number of customers for each date of the day is used.

If a move start command is inputted to the move command inputting device 2, the route selecting section 25 is activated by the controller 22. FIG. 8 is a flow chart showing a procedure for a processing performed by the route selecting section 25. First, the route selecting section 25 calculates a date of the day of issue by means of the clock 26 (step 100). Alternatively, the date of the day may be inputted by the clerk in change. Next, the determined date of the day is used as a key to read an estimated number of customers corresponding to that date of the day from the table 43 of an estimated number of customers for each date of the day (step 110). For example, if the date of the day is 4/10 (10th of April,) the estimated number of customers who come to the branch is 110. The estimated number of customers who come to the branch is used as a key to read a route pattern corresponding to the estimated number of customers from the table 42 of a route pattern for each estimated number of customers (step 120). The read route pattern is a route pattern for the day of issue. In the above-exemplified case where the estimated number of customers who come to the branch is 1100, the route pattern assumes PATTERN 6 since that case corresponds to the case of $\geq 1000$ in the table 42 of a route pattern for each estimated number of customers. A counter i is initialized (step 130). The counter i is provided for controlling the number of times of repetition of a processing from step 140 to step 170 of FIG. 8. The i-th transaction processing apparatus identifying name and the i-th moving-route name are read from the moving-route table 41 is sent to the coordinate transforming section 24 (step 140). If a transmission end message is received from the coordinate transforming section 24 (step 150), i is incremented (step 160). Whether the i-th transaction processing apparatus identifying name and the i-th moving-route name are present in the route pattern table 41 is checked (step 170). If present, the flow is returned to step 140. On the other hand, if not present, the flow is finished.

Figure 9:
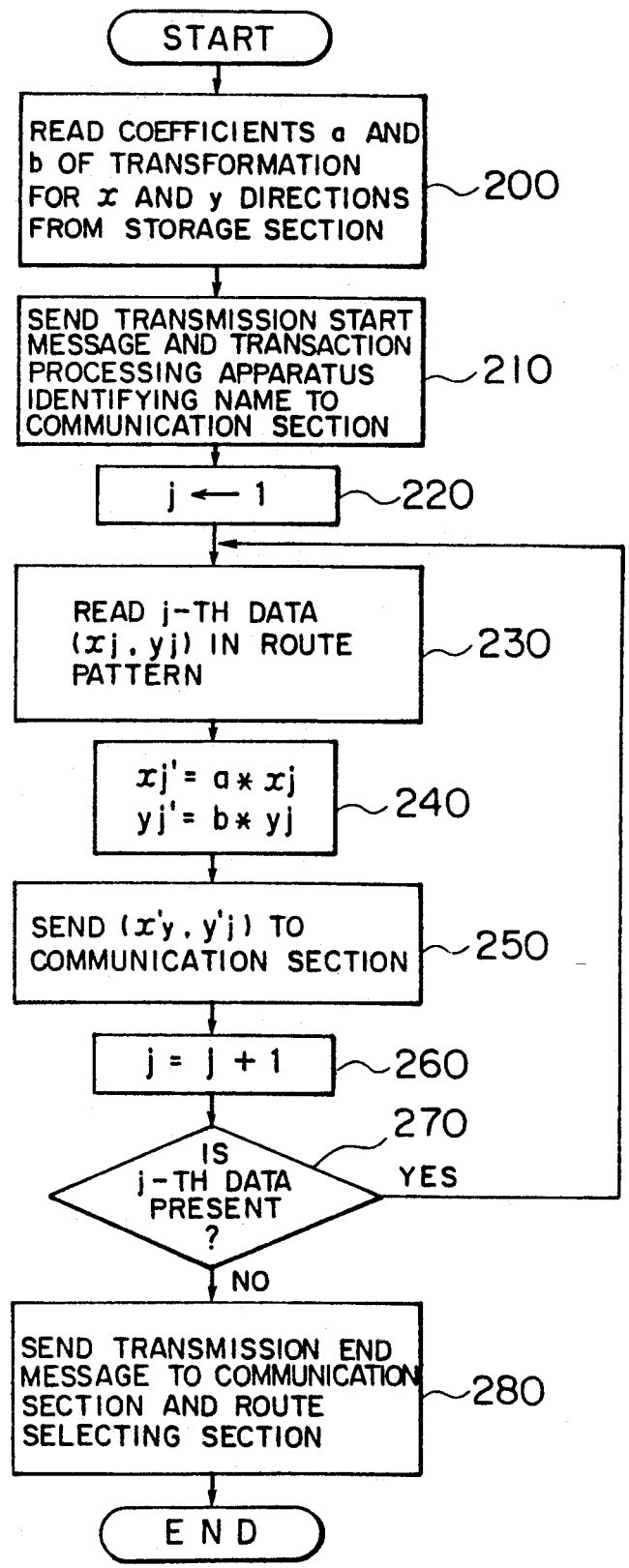
FIG. 9 is a flow chart representing a procedure for a processing performed by a coordinate transforming section.

If the coordinate transforming section 24 receives the transaction processing apparatus identifying name and the moving-route name sent in step 140, the coordinate transforming section 24 performs a processing along a flow chart shown in FIG. 9. First, the coordinate transforming section 24 reads the coefficients of transformation (a for an x-axis direction and b for a y-axis direction) between the coordinate system on the CRT display screen and the coordinate system in the branch are read from the storage section 23 (step 200). The coefficients of transformation are scalling factors for displaying a part or the whole of the layout of the branch on a reduced scale on the CRT display screen. A transmission start message and the transaction processing apparatus identifying name are sent to the communication section 27. The communication section 27 sends the transaction processing apparatus identifying name and the moving-route name to the radio communication device 3. The radio communication device 3 transmits a moving-route transmission start message to the transaction processing apparatus 1 corresponding to the transaction processing apparatus identifying name (step 210). Upon reception of the transmission start message, the transaction processing apparatus 1 is brought into a stand-by condition for receiving the moving route. The coordinate transforming section 24 initializes a counter j (step 220). The counter j is provided for controlling the number of times of repetition of a processing from step 230 to step 270. The coordinate transforming section 24 reads the j-th coordinate value $(x_j, y_j)$ or strictly $(x_{ij}, y_{ij})$ in the moving-route name from the storage section 23 (step 230) and transforms it from one on the coordinate system on the CRT display screen to one the coordinate system in the branch by means of the coefficients of transformation. Provided that the coordinate value on the coordinate system in the branch is $(x'_j, y'_j)$, the coordinate value is determined as $x'_j = a*x_j$ and $y'_j = b*y_j$ (step 240) and the determined coordinate value $(x'_j, y'_j)$ is sent to the communication section 27 (step 250). Here, * is the symbol of multiplication.

The communication section 27 sends the transformed coordinate value $(x'_j, y'_j)$ to the radio communication device 3. The radio communication device 3 transmits the received coordinate value to the transaction processing apparatus 1 which has transmitted the transmission start command. The transaction processing apparatus 1 receives the coordinate value at the radio communication section 10 and stores it into the route storing section 13 through the controller 12.

The coordinate transforming section 24 increments j (step 260) and checks whether or not the j-th data in the moving-route name is present (step 270). If present, the flow is returned to step 230. If not present, the coordinate transforming section 24 sends a transmission end message to the route selecting section 25 and the communication section 27 (step 280) and terminates its operation.

Then, if a move start command is inputted from the move command inputting device 2, the radio communication device 3 transmits the move start command to all the transaction processing apparatuses 1. Upon reception of the move start command, the controller 12 of each transaction processing apparatus 1 sends the start command to the drive controlling section 15 and the current-position detecting section 14.

In the current-position detecting section 14, the current position of the transaction processing apparatus is determined periodically (for example, at every 0.1 second) in terms of the coordinate value on the coordinate system in the branch and the determined current position is sent to the drive controlling section 15. Various techniques are known for means for detecting the current position. For example, there is a technique according to which a position indicating code is provided for each section or part of a route on which a moving vehicle runs and the code is read on the vehicle to detect the current position.

The drive controlling section 15 reads the first coordinate $(x'_1, y'_1)$ from the route storing section 13. This coordinate $(x'_1, y'_1)$ is compared with the current coordinate $(x_p, y_p)$ sent from the current-position detecting section 14 to determine the direction of movement and the result is sent to the vehicle body driving section 16. As the prior art is known a technique according to which a given moving-route and the current position are compared with each other to determine the amount for steering.

The vehicle body driving section 16 drives the body of the vehicle on the basis of the direction of movement determined by the drive controlling section 15 so that the transaction processing apparatus 1 is moved along the moving route stored in the route storing section 13 and is stopped when reaching the final point.

When the transaction processing apparatus 1 reaches a predetermined position, a transaction start command is transmitted to each transaction processing apparatus 1 from the move command inputting device 2 through the radio communication device 3. Thereby, the transaction processing section 11 is activated so that various transactions including the deposit of savings, the withdrawal of savings, the sending of money to account and the payment of public utility charges are started. The communication to be conducted between transaction processing apparatus 1 and the host computer 4 with regard to the transactions is made through the radio communication device 3.

By preliminarily establishing the moving-route table 40, the route pattern table 41, the table 42 of a route pattern for each estimated number of customers and the table 43 of an estimated number of customers for each date of the day in the move command inputting device 2, as has been mentioned, it becomes possible to automatically arrange or install the transaction processing apparatuses 1 at proper places.

(1-b) When Estimated Number of Customers for Each Day of Week is Used

A table 44 of an estimated number of customers (who come to the branch) for each day of the week (see FIG. 10) is used in place of the table 43 of an estimated number of customers (who come to the branch) for each date of the day in the embodiment (1-a). The table 44 of an estimated number of customers for each day of the week is produced in a similar manner to the table 43 of an estimated number of customers for each date of the day by inputting a command for production of the table 44 of an estimated number of customers for each day of the week and inputting the day of the week and the estimated number of customers in a pair.

FIG. 11 is a flow chart showing a procedure for a processing performed by the route selecting section 25 in the case where the table 44 of an estimated number of customers for each day of the week is used. First, the day of the week for the day of issue is determined by means of the clock 26 (step 300). The determined day of the week as a key to determine an estimated number of customers (who come to the branch) from the table 44 of an estimated number of customers for each day of the week (step 310). Subsequent steps 320 to 370 are similar to steps 120 to 170 in FIG. 8 mentioned in conjunction with the embodiment (1-a). A processing performed by the coordinate transforming section 24, too, follows the flow chart shown in FIG. 9, like the embodiment (1-a), and processings and operations at the other sections or devices (including the communication section 27, the radio communication device 3 and the transaction processing apparatus 1), too, is similar to those in the embodiment (1-a). As a result, it becomes possible to automatically arrange or install the transaction processing apparatuses 1 at proper places.

By using the table 44 of an estimated number of customers for each day of the week, the registration of the estimated numbers of customers for seven days (from Sunday to Saturday) suffices for making it possible to move the transaction processing apparatus in the case where the transaction processing apparatus is preliminarily established in accordance with the estimated number of customers who come to the branch. The change from the embodiment (1-a) to the embodiment (1-b) can be made by merely transforming the estimated number of customers for each date of the day into the estimated number of customers for each day of the week without making any modification to the other sections.

(1-c) When Estimated Number of Customers for Each Date of Day and Estimated Number of Customers for each Day of Week are Used Together By using the table 43 of an estimated number of customers (who come to the branch) for each date and the table 44 of an estimated number of customers (who come to the branch) for each day of the week in combination to determine an estimated number of customers (who come to the branch) for the day of issue, it is possible to register an estimated number of customers in which a change of an estimated number of customers on a specific day such as a specific day (10th day, 20th day or 30th day) for transaction, a day for the sending of salary to employee's account, or the like is taken into consideration in addition to a change of an estimated number of customers at the cycle in a week. In this case, since two estimated numbers of customers corresponding to the terms of the day of issue (the date of the day and the day of the week) are read from the two tables, it becomes necessary to determine an appropriate estimated number of customers from the two estimated numbers of customers. For that purpose, a priority column is provided in each of a table 45 of an estimated number of customers (who come to the branch) for each date of the day as shown in FIG. 12 and a table 46 of an estimated number of customers (who come to the branch) for each day of the week as shown in FIG. 13.

Figure 14:
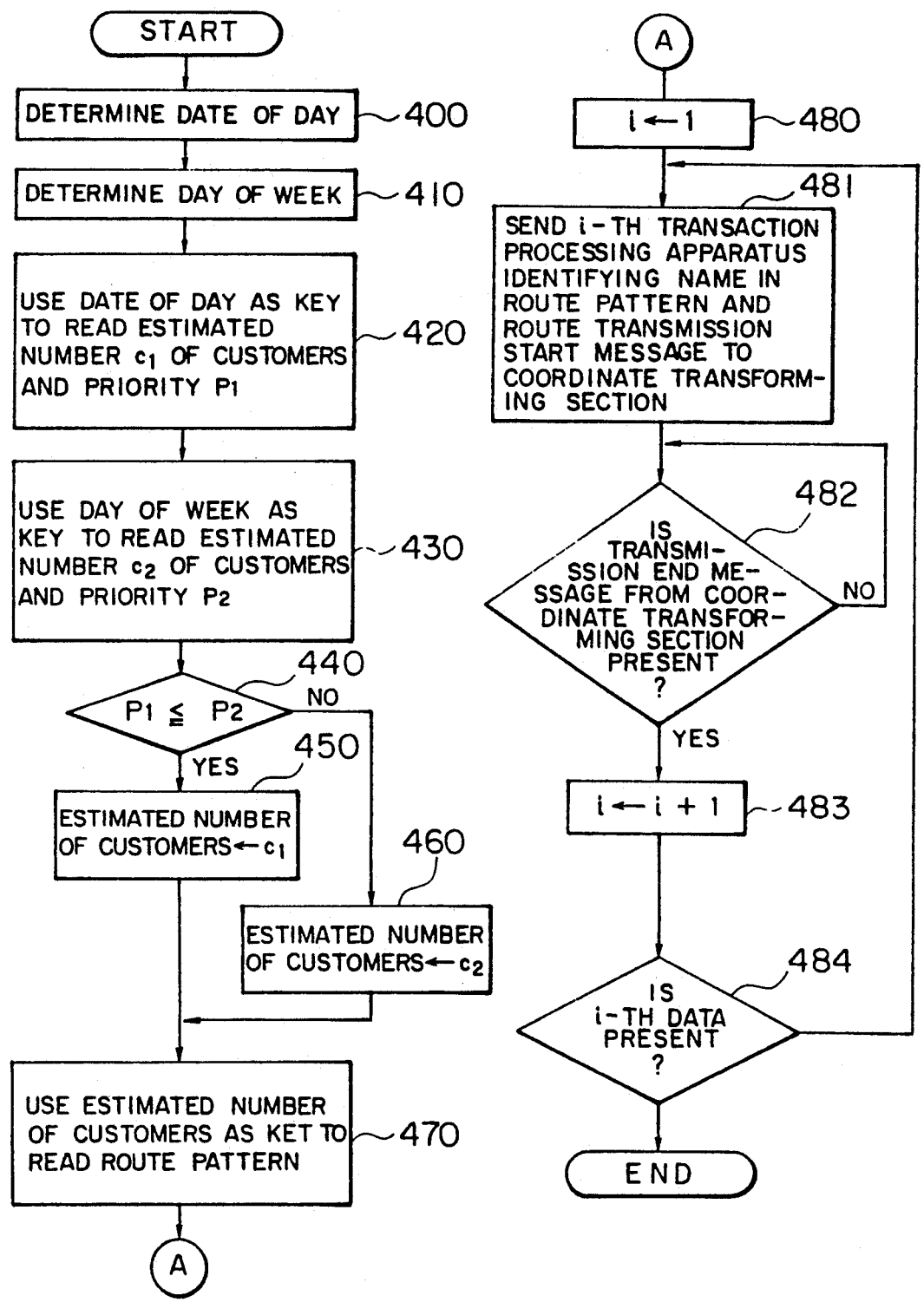
FIG. 14 is a flow chart representing a procedure for a processing performed by the route selecting section in the case where the table of an estimated number of customers for each date of the day provided with a priority column and the table of an estimated number of customers for each day of the week provided with a priority column are used together.

FIG. 14 is a flow chart showing a procedure for a processing performed by the route selecting section 25 in the case where the table 45 of an estimated number of customers for each date of the day and the table 46 of an estimated number of customers for each day of the week are used. First, the route selecting section 25 determines the date of the day and the day of the week by means of the clock 26 (steps 400 and 410). Next, the date of the day is used as a key to read an estimated number $c_1$ of customers (who come to the branch) and a priority $p_1$ from the table 45 of an estimated number of customers for each date of the day (step 420) and the day of the week is used as a key to read an estimated number $c_2$ of customers (who come to the branch) and a priority $p_2$ from the table 46 of an estimated number of customers for each day of the week (step 430). The priorities $p_1$ and $p_2$ are compared with each other (step 440). In the case where $p_1 \leq p_2$, an estimated number c of customers who come to the branch is set to $c_1$ (step 450). In the case where $p_1 > p_2$, c is set to $c_2$ (step 460). Subsequent steps 470 to 484 are similar to steps 120 to 170 in the embodiment (1-a). A processing performed by the coordinate transforming section 24, too, follows the flow chart shown in FIG. 9, and processings and operations at the other sections or devices (including the communication section 27, the radio communication device 3 and the transaction processing apparatus 1), too, is similar to those in the embodiment (1-a). As a result, it becomes possible to automatically arrange or install the transaction processing apparatuses 1 at proper places.

By using the table 45 of an estimated number of customers for each date of the day and the table 46 of an estimated number of customers for each day of the week in combination, as has been mentioned, it becomes possible to register an estimated number of customers in which a change of an estimated number of customers on a specific day such as a specific day (10th day, 20th day or 30th day) for transaction, a day for the sending of salary to employee's account, or the like is taken into consideration in addition to a change of an estimated number of customers at the cycle in a week.

(2) CHANGE OF PLACE OF INSTALLATION OF TRANSACTION PROCESSING APPARATUS IN ACCORDANCE WITH ESTIMATED FREQUENCY OF USE OF TRANSACTION PROCESSING APPARATUS FOR EACH TRANSACTION SUBJECT

The move command inputting device 2 produces a table 47 of a route pattern for each estimated frequency of use (or estimated number of transactions) for each transaction subject in which an estimated frequency of use of a transaction processing apparatus (or estimated number of transactions) for each transaction subject and a route pattern are paired (see FIG. 15). If the estimated frequency of use and the route pattern are inputted in a pair after a command for production of the table 47 of a route pattern for each estimated frequency of use for each transaction subject has been inputted, the data is stored into the storage section 23. When the inputting of data has been completed, an input completion command is inputted.

Next, the move command inputting device 2 produces a table 48 of an estimated frequency of use (or estimated number of transactions) for each transaction subject for each day of the week in which a day of the week and an estimated frequency of use (or estimated number of transactions) for each transaction subject are paired (see FIG. 16). If a date of the day and an estimated number of customers who come to the branch are inputted in a pair after a command for production of the table 48 of an estimated frequency of use for each transaction subject for each day of the week has been inputted, the data is stored into the storage section 23. The estimated number of customers who come to the branch is established by a clerk in change on the basis of data which is experientially obtained. When the inputting of data has been completed, the move command inputting device 2 inputs an input completion command.

Figure 17:
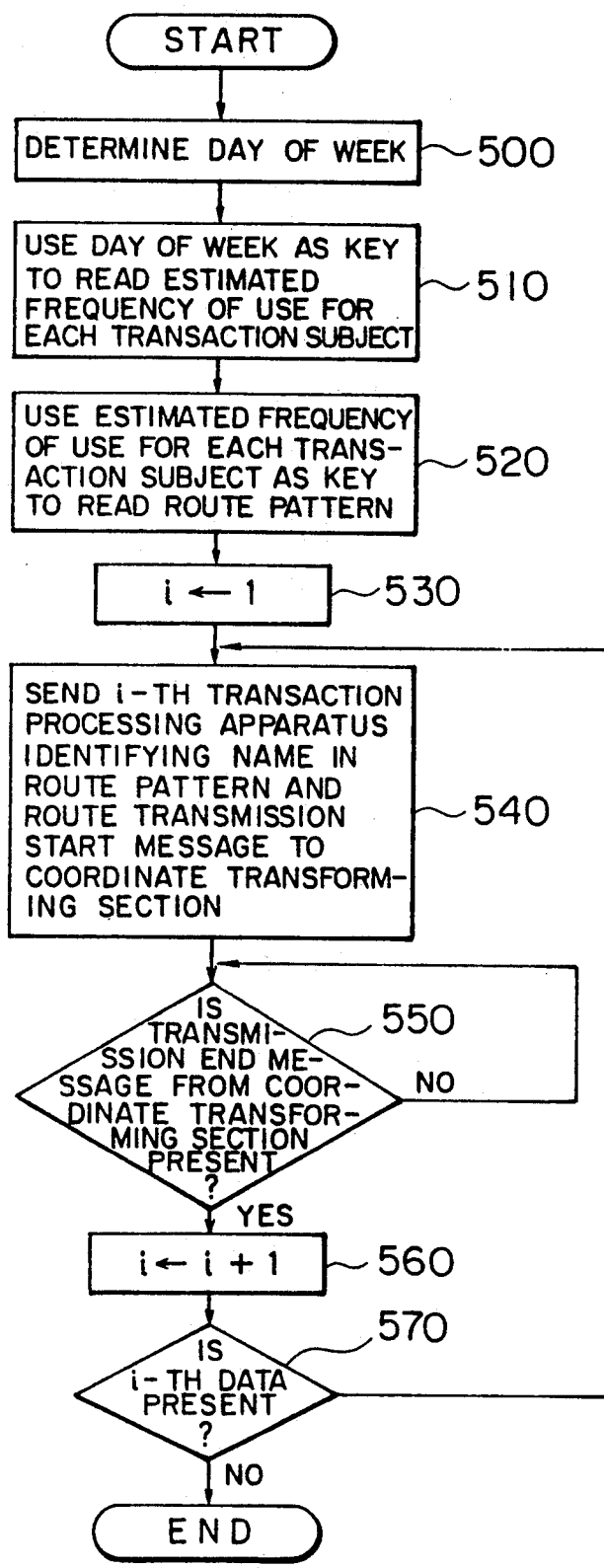
FIG. 17 is a flow chart representing a procedure for a processing performed by the route selecting section in the case where the table of an estimated frequency of use for each transaction subject for each day of the week is used.

FIG. 17 is a flow chart showing a procedure for a processing performed by the route selecting section 25 in the case where the table 48 of an estimated frequency of use for each transaction subject for each day of the week is used. First, the day of the week is determined by means of the clock 26 (step 500). Next, the determined day of the week is used as a key to read an estimated frequency of use for each transaction subject from the table 48 of an estimated frequency of use for each transaction subject for each day of the week (step 510). The read estimated frequency of use for each transaction subject is used to read a route pattern from the table 47 of an route pattern for each frequency of use for each transaction subject (step 520). Subsequent steps 530 to 570 are similar to steps 130 to 170 in the embodiment (1-a). A processing performed by the coordinate transforming section 24, too, follows the flow chart shown in FIG. 9, like the embodiment (1-a), and processings and operations at the other sections or devices (including the communication section 27, the radio communication device 3 and the transaction processing apparatus 1), too, are similar to those in the embodiment (1-a). As a result, it becomes possible to automatically arrange or install the transaction processing apparatuses 1 at proper places.

As further embodiments of the present invention can be employed a method in which only an estimated frequency of use for each transaction subject for each date of the day is used and a method in which an estimated frequency of use for each transaction subject for each date of the day and an estimated frequency of use for each transaction subject for each day of the week are used in combination.

By using an estimated frequency of use for each transaction subject, it becomes possible to automatically change the layout of a transaction processing apparatus such as a machine for only the deposit/withdrawal of savings, a machine for only the sending of money to account, a machine for the payment of public utility changes, or the like in accordance with the estimated frequency of use for each transaction subject.

(3) AUTOMATIC UPDATING OF ESTIMATED FREQUENCY OF USE OF TRANSACTION PROCESSING APPARATUS FOR EACH TRANSACTION SUBJECT

A table of an estimated frequency of use for each transaction subject for each date of the day, each day of the week and/or each time of the day is automatically updated by extracting the date of the day, the day of the week and the transaction subject from transaction data exchanged between the transaction processing apparatus 1 and the host computer 4, and examining the number of transactions for each transaction subject for each date of the day, each day of the week and/or each time of the day performed by the transaction processing apparatus to use the number of transactions for production of the table. The present embodiment will be explained taking as an example the case where the table 48 of an estimated frequency of use for each transaction subject for each day of the week is updated.

The number of transactions processed by the transaction processing apparatus 1 on and after the start of transactions for one day is cumulatively stored into a table 49 of a cumulative number of transactions in the storage section 23 of the move command inputting device 2 (see FIG. 18). A procedure for this processing is as follows. First, transaction data is sent from the radio communication device 3 to the controller 22 through the communication section 27 of the move command inputting device 2. Next, in the control section 22, the transaction subject is extracted from the transaction data. Finally, the corresponding transaction subject in the table 49 of a cumulative number of transactions in the storage section is incremented. The above processing is repeated throughout the day.

Figure 19:
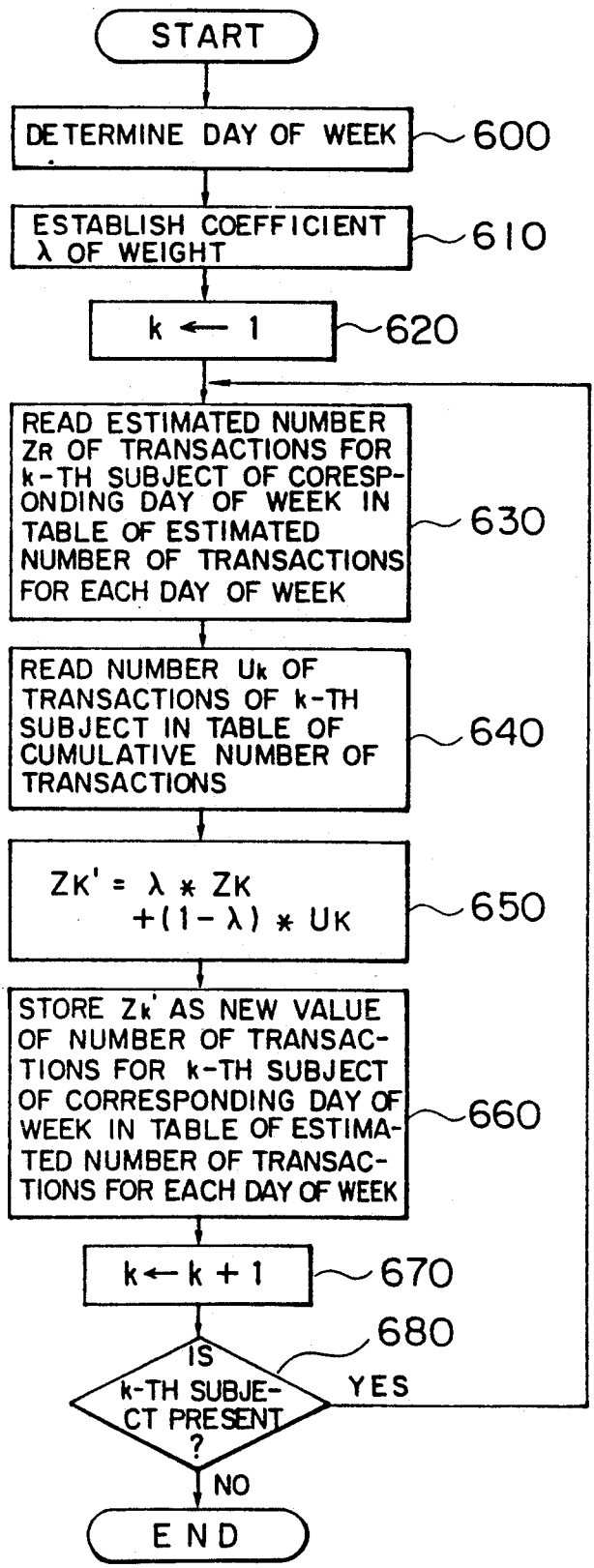
FIG. 19 is a flow chart of a procedure for a processing for updating the table of an estimated frequency of use for each transaction subject for each day of the week.

After the close of transactions for one day, the table 48 of an estimated frequency of use for each transaction subject for each day of the week is updated. FIG. 19 is a flow chart showing a procedure for a processing of updating the table 48 of an estimated frequency of use for each transaction subject for each day of the week. First, the controller 22 determines the day of the week for the day of issue by means of the clock 26 (step 600). A coefficient $\lambda$ of weight used when the average is taken of the frequency value in the table 48 of an estimated frequency of use for each transaction subject for each day of the week and the number of transactions thoughout the day of issue is established (step 610). Next, k is initialized (step 620). The estimated number $z_k$ of transactions for the k-th transaction subject of the corresponding day of the week in the table 48 of an estimated frequency of use for each transaction subject for each day of the week is read (step 630). The number $u_k$ of transactions of the k-th transaction subject in the table 49 of a cumulative number of transactions is read (step 640). It is assumed that the k-th transaction subject in the table 48 of an estimated frequency of use for each transaction subject for each day of the week is the same as the k-th transaction subject in the table 49 of a cumulative number of transactions. Provided that a new value of the frequency of use for the k-th transaction subject in the table 48 of an estimated frequency of use for each transaction subject for each day of the week is $z'_k$, $z'_k$ is determined by $z'_k = \lambda * z_k + (1-\lambda) * u_k$ (step 650). Here, * is the symbol of multiplication. Next, $z'_k$ is stored as a value of the frequency of use for the k-th transaction subject in the table 48 of an estimated frequency of use for each transaction subject for each day of the week (step 660). Next, k is incremented (step 670). In the case where the k-th transaction subject is present in the table 48 of an estimated frequency of use for each transaction subject for each of the week, the flow is returned to step 630, and in the case where not present, the processing is finished (step 680).

As a result, it becomes possible to automatically update the table 48 of an estimated frequency of use for each transaction subject for each day of the week so that the transaction processing apparatus 1 is arranged at an appropriate place in the branch in accordance with the up-to-date conditions of transactions.

According to the present invention, since a transaction processing apparatus is provided with a self-running function and an appropriate moving-route of the transaction processing apparatus is selected by use of an estimated number of customers who come to a branch or an estimated frequency of use of the transaction processing apparatus for each transaction subject, it becomes possible to automatically change the place of installation of the transaction processing apparatus in accordance with the estimated number of customers who come to the branch or the conditions of use of the transaction processing apparatus.

Also, since an estimated frequency of use for each transaction subject in a move command inputting device can be automatically modified or updated by use of transaction data exchanged between the transaction processing apparatus and a host computer, a change of the place of installation of the transaction processing apparatus adapted to the present situation of the branch can be made with no human efforts.

We claim:

1. A transaction processing system comprising:
a processor for determining a moving route of a transaction processing apparatus installed at a first position in a layout, the transaction processing apparatus being operated by customers at the first position and being moved to a second position to change the layout of a place where said transaction processing apparatus is installed, said processor including means for determining said moving route of said transaction processing apparatus according to at least one feature of a day; and
said transaction processing apparatus determined to be moved by said processor, comprising,
means for moving said transaction processing apparatus built therein;
means for obtaining said moving route from said processor;
means for recognizing an intermediate position of said transaction processing apparatus; and
means for controlling said moving means in accordance with said recognized intermediate position of said transaction processing apparatus so that said transaction processing apparatus moves along said moving route obtained from said processor from the first position to the second position.

2. The transaction processing system according to claim 1, wherein said obtaining means is a radio communication device which includes means for receiving said moving route from said processor.

3. The transaction processing system according to claim 1, wherein said feature depends on at least one of a day of a week and a date of the day.

4. The transaction processing system according to claim 1, wherein said feature is at least one of an estimated number of customers and an estimated frequency of use for each transaction subject.

5. A transaction processing system having at least one transaction processing apparatus installed at a first position in a layout of a place, the transaction processing apparatus being operated by customers at the first position, the system comprising:
means for inputting data relative to a feature of a day;
means for determining a moving route of said transaction processing apparatus from the first position to a second position in response to said inputted data in order to arrange the layout of the place where said transaction processing apparatus is installed; and
means for outputting said determined moving route to said transacting processing apparatus whereby said transaction processing apparatus can move along said determined moving route.

6. The transaction processing system according to claim 5, wherein said feature depends on at least one of a day of a week and a date of the day.

7. The transaction processing system according to claim 5, wherein said feature is at least one of an estimated number of customers and an estimated frequency of use for each transaction subject.

8. A transaction processing apparatus installed at a first position in a layout and operated by customers at the first position, comprising:
means for obtaining a moving route along which said transaction processing apparatus should move from the first position to a second position where said transaction processing apparatus should be newly installed, in order to change the layout of a place where said transaction processing apparatus is installed;
means for moving said transaction processing apparatus built therein;
means for recognizing an intermediate position of said transaction processing apparatus; and
means for controlling said moving means in accordance with said recognized intermediate position of said transaction processing apparatus so that the transaction processing apparatus moves along said moving route obtained by said obtaining means from the first position to the second position.

9. A transaction processing apparatus installed at a first position in a layout and operated by customers at the first position, comprising:
receiver for receiving a moving route along which said transaction processing apparatus should move from the first position to a second position where said transaction processing apparatus should be newly installed, in order to arrange layout of a place where said transaction processing apparatus is installed;
driving device for moving said transaction processing apparatus built therein;
detector for detecting an intermediate position of said transaction processing apparatus;
controller for controlling said driving device in accordance with said detected intermediate position whereby said transaction processing apparatus moves along said moving route received by said receiver.

10. A transaction processing system comprising:
a processor for determining a moving route of a transaction processing apparatus installed at a first position in a layout and operated by customers at the first position, the transaction processing apparatus to be moved from the first position to a second position to change the layout of a place where said transaction processing apparatus is installed, said processor including means for determining said moving route of said transaction processing apparatus to be moved according to at least one feature of a day; and
said transaction processing apparatus determined to be moved by said processor, comprising,
driving device for driving said transaction processing apparatus built therein;

receiver for receiving said moving route from said processor;

detector for detecting an intermediate position of said transaction processing apparatus; and controller for controlling said moving means in accordance with said detected intermediate position whereby said transaction processing apparatus moves along said moving route received from said receiver from the first position to the second position.

11. The transaction processing system according to claim 10, wherein said receiver is a radio communication device.

12. The transaction processing system according to claim 10, wherein said feature depends on at least one of a day of a week and a date of the day.

13. The transaction processing system according to claim 10, wherein said feature is at least one of an estimated number of customers and an estimated frequency of use for each transaction subject.

14. A transaction processing system having at least one transaction processing apparatus installed at a first position of a layout and operated by customers at the first position, comprising:

inputting device for inputting data relative to a feature of a day;

processor for determining a moving route of said transaction processing apparatus from the first position to a second position in response to said inputted data in order to change the layout of a place where said transaction processing apparatus is installed; and outputting device for outputting said determined moving route whereby said transaction processing apparatus can move along said determined moving route.

15. The transaction processing system according to claim 14, wherein said feature depends on at least one of a day of a week and a date of the day.

16. The transaction processing system according to claim 14, wherein said feature is at least one of an estimated number of customers and an estimated frequency of use for each transaction subject.

17. A layout changing system for a transaction processing system in a branch of a bank, comprising:

a processor determining a moving route of a transaction processing apparatus installed at a first position in a layout of the bank, the transaction processing apparatus being operated by customers at the first position and moved to a second position to change the layout of said branch where said transaction processing apparatus is installed; and said transaction processing apparatus determined to be moved by said processor, comprising, means for moving said transaction processing apparatus from the first position to the second position built therein;

means for obtaining said moving route from said processor;

mean for recognizing an intermediate position of said transaction processing apparatus;

means for controlling said moving means in accordance with said recognized intermediate position whereby said transaction processing apparatus moves along said moving route obtained from said processor from the first position to the second position.

18. A layout changing system for a transaction processing system having at least one transaction processing apparatus installed at a first position in a layout and operated by customers at the first position, comprising:

inputting device for inputting data relative to a feature of a day;

processor for determining a moving route on said transaction processing apparatus from the first position to a second position in response to said inputted data in order to change said layout of the branch; and outputting device for outputting said determined moving route whereby said transaction processing apparatus can move along said determined moving route.

19. The layout changing system according to claim 18, wherein said outputting device is a display device.

20. A layout changing method for a transaction processing system which includes a processor and at least one transaction processing apparatus installed at a first position of a layout of a branch of a bank and operated by customers at the first position, the method comprising the steps of:

determining a moving route of said transaction processing apparatus to be moved from the first position to a second position to change the layout of said branch where said transaction processing apparatus is installed;

recognizing an intermediate position of said transaction processing apparatus; and controlling movement of said transaction processing apparatus in accordance with said recognized intermediate position so that said transaction processing apparatus is moved along said moving route determined in said determining step.

21. A layout changing method for a transaction processing system having at least one transaction processing apparatus installed at a first position of a layout and operated by customers at the first position, the method comprising the steps of:

inputting data relative to a feature of a day;

determining a moving route of said transaction processing apparatus from the first position to a second position in response to said inputted data in order to change said layout of the branch; and outputting said determined moving route whereby said transaction processing apparatus is moved along said determined moving route.

22. A transaction processing method comprising the steps of:

determining a moving route of a transaction processing apparatus installed at a first position in a layout and operated by customers at the first position, to be moved to a second position to change the layout of a place where said transaction processing apparatus is installed, the determining comprises determining said moving route of said transaction processing apparatus to be moved according to at least one feature of a day;

recognizing an intermediate position of said transaction processing apparatus; and controlling movement of said transaction processing apparatus in accordance with said recognized intermediate position whereby said transaction processing apparatus moves along said moving route determined in said determining step from the first position to the second position.

23. The transaction processing method according to claim 22, wherein said feature depends on at least one of a day of a week and a date of the day.

24. The transaction processing method according to claim 22, wherein said feature is at least one of estimated number of customers and an estimated frequency of use for each transaction subject.

* * * * *

UNITED STATES PATENT AND TRADEMARK OFFICE
CERTIFICATE OF CORRECTION

PATENT NO. : 5,276,617
DATED : January 4, 1994
INVENTOR(S) : Masaaki Hiroya, et al.

It is certified that error appears in the above-indentified patent and that said Letters Patent is hereby corrected as shown below:

Claim 5, column 14, line 4, delete "transacting" and substitute therefor --transaction--.

Claim 18, column 16, line 3, delete "on" and substitute therefor --of--.

Signed and Sealed this

Tenth Day of May, 1994

Attest:

BRUCE LEHMAN

Attesting Officer     Commissioner of Patents and Trademarks